March 19, 1968     J. BALEJ ETAL     3,374,164
ELECTROLYZER FOR SIMULTANEOUS PREPARATION
OF CHLORINE AND ALKALI CARBONATES
Filed June 10, 1964

INVENTORS
Jan Balej
Ivo Paseka
Jiří Vondrák
Vojtěch Koudelka
by Michael J. Striker

United States Patent Office 3,374,164
Patented Mar. 19, 1968

3,374,164
ELECTROLYZER FOR SIMULTANEOUS PREPARATION OF CHLORINE AND ALKALI CARBONATES
Jan Balej, Ivo Paseka, and Jiří Vondrák, Prague, and Vojtěch Koudelka, Mlada Boleslav, Czechoslovakia, assignors to Ceskoslovenska Akademie Ved, Prague, Czechoslovakia
Filed June 10, 1964, Ser. No. 374,077
Claims priority, application Czechoslovakia,
June 28, 1963, 3,729/63
11 Claims. (Cl. 204—265)

ABSTRACT OF THE DISCLOSURE

An electrolytic device for the simultaneous production of chlorine and alkaline carbonates comprises an anode, a cathode, means for introducing carbon dioxide into the cathode space, and a diaphragm which is separated from the active surface of the cathode. The diaphragm may be arranged on and adhered to a separate auxiliary screen which is spaced from the cathode and consists of an insulating material or of metal coated with an insulating surface. The diaphragm may also be arranged directly on the cathode which at the side where the diaphragm is arranged is provided with an insulating coating which separates the diaphragm from the active surface of the cathode. The cathode may consist of a screen or other apertured body and the carbon dioxide may be introduced into the space adjacent that portion of the cathode which is free of said insulating coating. The diaphragm may consist of asbestos or a plastic. The efficiency of the electrode is thus increased, since migration of the hydroxyl ions prior to carbonation is prevented.

---

Figure 1:
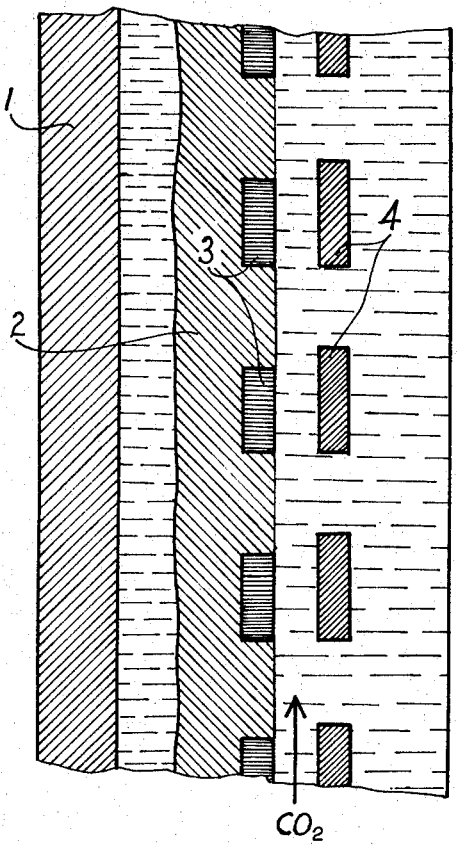

Object of this invention is an electrolyzer for simultaneous preparation of chlorine and of alkaline carbonates.

There is a known electrolytic process for the preparation of chlorine from alkali chlorides, where the simultaneously obtained alkali hydroxide is converted by additional carbonation to an alkali carbonate. This requires however when using the diaphragm process to remove by filtration remnants of chlorides from the catholyte after its prior thickening. This process has the drawback of a substantial consumption of heat energy for the said thickening of the catholyte.

An improvement of this process is described for instance in the German Patent No. 85,041 proposing to process the original raw catholyte to an alkali carbonate so that the catholyte with 110 to 135 g. NaOH and 190 to 175 g. NaCl in one liter of brine is converted in carbonating columns by carbon dioxide to an acid carbonate, which is converted after filtration to a normal carbonate. For this process, the arrangement of the electrolyzers remains unchanged, the thickening of the lye in the evaporator is not necessary, but the degree of conversion of chloride contained in the raw electrolyte to a hydroxide and thus to a carbonate is 50% at the most, as the achievement of a higher conversion rate is linked with a considerable reduction of the electrolytic efficiency in the electrolytic process.

A high conversion rate of chloride to carbonate at equally high electrolytic efficiency can be obtained by direct conversion of the originating hydroxyl ions to carbonate ions within the cathode space of the electrolyzer. This is caused by the reduced mobility of the $CO_3^=$ ions with respect to the $OH^-$ ions so that their relative amount transmitted by migration from the cathode space to the anode space and thus the losses in products are smaller. According to this method soda has been produced according to Hargreaves-Bird (see British Patents No. 5197 and 5198). This method of manufacturing has been however dropped as the electrolytic efficiency with electrolyzer of this kind do not meet the present requirements.

The application of known diaphragm electrolyzers with a vertical filter diaphragm for the preparation of chlorine and lyes for the manufacture of sodium carbonate using a direct carbonation of the electrolyte in the cathode space is not advantageous. The diaphragm in these electrolyzers is generally obtained by fixing an asbestos layer upon the cathode screen by suction. The thus arranged cathode with a sucked on diaphragm is however not suitable for carbonation of the electrolyte in the cathode space, as part of the OH ions originating on the surface of the cathode covered by the diaphragm are not accessible to carbonation and are subject to migration to the anode space. Thus losses occur and the possibility of increasing the rate of conversion while maintaining a high electrolytic efficiency is not utilized to a full degree.

These drawbacks are eliminated by the electrolyzer according to this invention for simultaneous preparation of chlorine and of alkali carbonates with a vertical filter diaphragm, where carbon dioxide is introduced into the cathode space. The essential feature of this invention is in that the active cathode surface is separated from the diaphragm and the separated diaphragm fixed to an auxiliary screen made of insulating material or made of metal and covered with an electrically insulating and corrosion resistant coating. According to an alternative of this invention the separation of the active cathode surface from the diaphragm is achieved by providing the part of the cathode surface facing the anode with an insulating coating.

The essential feature of this invention is therefore an improvement of an electrolyzer for the preparation of chlorine and of alkali carbonate by direct carbonation of the catholyte, where the prior mentioned drawback is eliminated by separating the cathode and the diaphragm. This arrangement allows to use efficient asbestos diaphragms and enables to achieve a high rate of conversion to carbonate while maintaining a high electrolytic efficiency.

According to this invention it is attempted to create favourable conditions for generation of hydroxyl ions (as the primary product of the cathode) only at those parts of the cathode, which are readily accessible to the carbon dioxide, introduced into the cathode space. Thus provision is made to prevent that part of the hydroxyl ions migrate without carbonation and due to the action of the electric field enter into the pores of the diaphragm and further into the anode space.

Figure 2:
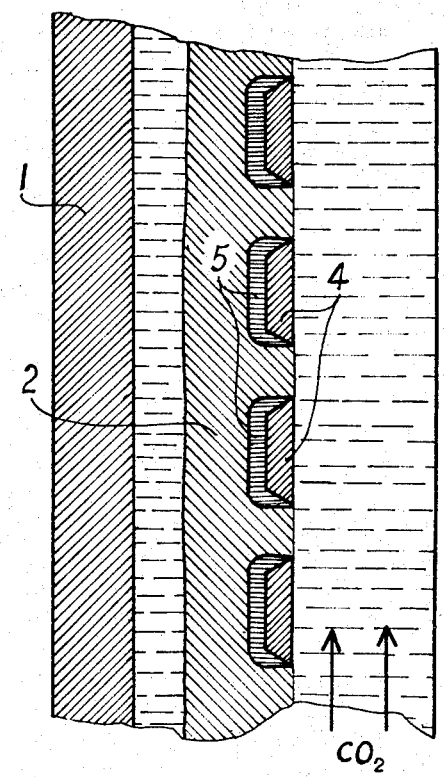

This result can be according to this invention achieved by two different arrangements of the electrolyzer as shown in the accompanying drawings, where FIG. 1 is a schematic cross-section of an electrolyzer perpendicular to the cathode surface, where the cathode is separated from the diaphragm and FIG. 2 is a cross section of an electrolyzer, where an insulating coating serves for separating the cathode from the diaphragm, said coating provided on the surface of the cathode facing the anode.

Referring to FIG. 1 there is a graphite anode 1, an asbestos diaphragm 2, sucked on an auxiliary screen 3 and a cathode 4. The auxiliary screen 3 is either of insulating material or of metal provided with an insulating coating or protected from corrosion due to cathode polarization at very low current density. The cathode 4 is represented by a wire screen or by a perforated sheet for a perfect and quick absorption of carbon dioxide in the catholyte mainly within the space between the cathode and the diaphragm. For the same reason the auxiliary supporting screen of the diaphragm can be suitably arranged similarly as means for the introduction of $CO_2$ in order to secure the quickest possible absorption of $CO_2$ in the space between the cathode and the diaphragm. Instead of an asbestos diaphragm it is also possible to use a diaphragm of plastics for instance of polyvinylchloride.

In FIG. 2 we see a graphite anode 1 and a cathode 4 made advantageously of perforated sheet material provided on the surface facing the anode with an insulating coating 5 of the above mentioned properties. The asbestos diaphragm 2 is sucked on the thus arranged cathodes. Carbon dioxide is admitted to the bottom of the cathode spaces.

With modern diaphragm electrolyzers producing chlorine and alkali hydroxides, a maximum of 50 to 53% conversion of chloride to hydroxide is achieved at an electrolytic efficiency of 95 to 96%. In case of introduction of $CO_2$ into the cathode space of such electrolyzers without application of the object of this invention a maximum conversion of 60% is achieved at equal electrolytic efficiency. With an electrolyzer according to FIG. 2 a 70 to 75% conversion can be achieved and with an electrolyzer according to FIG. 1 a 80% conversion of chloride to carbonate can be achieved at an electrolytic efficiency of 95 to 96%. The increased rate of conversion has a beneficial effect in the further processing of the catholyte to the final solid product both by a reduction of the volume of the circulating solutions and by the increased yields of the final solid product when processing catholytes rich in carbonate.

We claim:
1. An electrolytic device for the simultaneous production of chlorine and alkaline carbonates, comprising, in combination, an anode; a cathode; an auxiliary screen having an insulating surface and being disposed between said cathode and said anode; a filter diaphragm adhered to said screen; and means for introducing carbon dioxide into the cathode space.

2. The electrolytic device of claim 1, wherein the cathode consists of an apertured sheet.

3. The electrolytic device of claim 1, wherein the diaphragm is disposed substantially vertically and wherein the carbon dioxide is introduced into the cathode space from the bottom of the device.

4. The electrolytic device of claim 1, wherein the diaphragm consists of asbestos.

5. The electrolytic device of claim 1, wherein the diaphragm consists of a plastic material.

6. An electrolytic device for the simultaneous production of chlorine and alkaline carbonates, comprising, in combination, an anode; a cathode; an auxiliary screen having an insulating surface, said screen being disposed between said cathode and said anode and being spaced from said cathode at the side thereof facing the anode; a filter diaphragm adhered to said screen; and means for admitting carbon dioxide into the space between the cathode and the diaphragm.

7. The electrolytic device of claim 6, wherein the screen consists of metal provided with an electrically insulating and corrosion-resistant coating.

8. An electrolytic device for the simultaneous production of chlorine and alkaline carbonates, comprising an anode; an apertured cathode; an insulating coating provided on the side of the cathode facing the anode; a filter diaphragm adhered to said insulated surface of the cathode so as to be electrically insulated therefrom; and means for introducing carbon dioxide into the space adjacent the portion of the cathode that is free of said insulating coating.

9. The electrolytic device of claim 8, wherein the diaphragm is disposed substantially vertically and wherein the carbon dioxide is introduced into the cathode space from the bottom of the device.

10. The electrolytic device of claim 8, wherein the diaphragm consists of asbestos.

11. The electrolytic device of claim 8, wherein the diaphragm consists of a plastic material.

References Cited
UNITED STATES PATENTS

| | | | |
|---|---|---|---|
| 415,644 | 11/1889 | Kerner et al. | 204—265 |
| 548,162 | 10/1895 | Hargreaves et al. | 204—283 |
| 1,152,772 | 9/1915 | Wheeler | 204—283 |
| 1,771,091 | 7/1930 | Lawaczeck | 204—101 |
| 1,862,244 | 6/1932 | Stuart | 204—283 |
| 3,057,794 | 10/1962 | Carlin | 204—252 |

HOWARD S. WILLIAMS, *Primary Examiner.*

ROBERT K. MIHALEK, *Examiner.*

D. R. JORDAN, *Assistant Examiner.*